(12) United States Patent
Sasaki et al.

(10) Patent No.: US 11,518,108 B2
(45) Date of Patent: Dec. 6, 2022

(54) MANUFACTURING APPARATUS

(71) Applicant: FUJIFILM BUSINESS INNOVATION CORP., Tokyo (JP)

(72) Inventors: Shigehiko Sasaki, Kanagawa (JP); Wataru Suzuki, Kanagawa (JP); Taichi Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 241 days.

(21) Appl. No.: 16/984,298

(22) Filed: Aug. 4, 2020

(65) Prior Publication Data
US 2021/0178699 A1 Jun. 17, 2021

(30) Foreign Application Priority Data

Dec. 12, 2019 (JP) .............................. JP2019-224660

(51) Int. Cl.
*B29C 64/393* (2017.01)
*B29C 64/321* (2017.01)
*B33Y 50/02* (2015.01)
*B33Y 30/00* (2015.01)

(52) U.S. Cl.
CPC .......... *B29C 64/393* (2017.08); *B29C 64/321* (2017.08); *B33Y 30/00* (2014.12); *B33Y 50/02* (2014.12)

(58) Field of Classification Search
CPC .... B29C 64/393; B29C 64/321; B29C 64/336
See application file for complete search history.

(56) References Cited

U.S. PATENT DOCUMENTS

| 10,046,511 | B1 | 8/2018 | Mantha |
| 2020/0130276 | A1* | 4/2020 | Ueda ...................... B29C 64/241 |

FOREIGN PATENT DOCUMENTS

JP WO2018151074 A1 * 12/2019 ........... B29C 64/336

\* cited by examiner

*Primary Examiner* — Joseph S Del Sole
*Assistant Examiner* — John Robitaille
(74) *Attorney, Agent, or Firm* — Oliff PLC

(57) ABSTRACT

A manufacturing apparatus includes an acquisition unit and an elimination unit. The acquisition unit is configured to acquire information relating to an accumulation amount of a twisting force generated in a linear manufacturing material during applying. The elimination unit is configured to eliminate the twisting force based on the information relating to the accumulation amount.

14 Claims, 16 Drawing Sheets

MANUFACTURING APPARATUS

CROSS-REFERENCE TO RELATED APPLICATIONS

This application is based on and claims priority under 35 USC 119 from Japanese Patent Application No. 2019-224660 filed Dec. 12, 2019.

BACKGROUND

1. Technical Field

The present disclosure relates to a manufacturing apparatus for applying a manufacturing material.

2. Related Art

There are stack additive manufacturing apparatuses for stacking filaments to form an object (for example, U.S. Pat. No. 10,046,511).

SUMMARY

Aspects of non-limiting embodiments of the present disclosure relate to a manufacturing apparatus capable of reducing a twisting force accumulated in a manufacturing material as compared with a case of continuing manufacturing regardless of a twisted state of the manufacturing material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the disclosure, there is provided a manufacturing apparatus including an acquisition unit and an elimination unit. The acquisition unit is configured to acquire information relating to an accumulation amount of a twisting force generated in a linear manufacturing material during applying. The elimination unit is configured to eliminate the twisting force based on the information relating to the accumulation amount.

BRIEF DESCRIPTION OF THE DRAWINGS

Exemplary embodiment(s) of the present disclosure will be described in detail based on the following figures, wherein.

DETAILED DESCRIPTION

First Exemplary Embodiment

Figure 1:
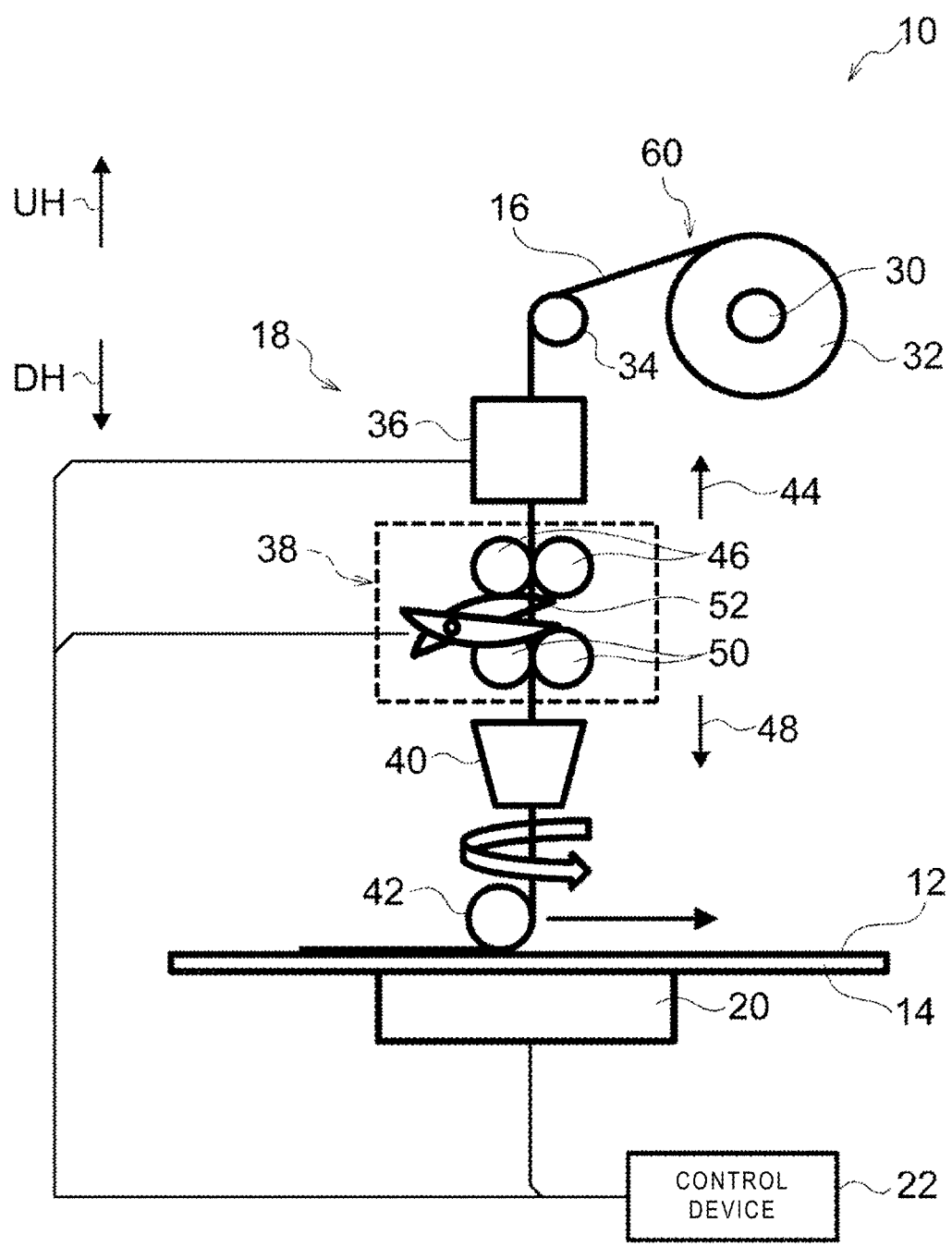
FIG. 1 is a schematic diagram illustrating a manufacturing apparatus according to a first exemplary embodiment.

An example of a manufacturing apparatus according to a first exemplary embodiment will be described with reference to the drawings. An up direction is indicated by UH and a down direction is indicated by DH in the drawings.

FIG. 1 is a diagram illustrating a manufacturing apparatus 10 according the present exemplary embodiment. The manufacturing apparatus 10 is an apparatus for manufacturing a three-dimensional object based on shape data.

The manufacturing apparatus 10 includes a table 14 having a manufacturing surface 12 on which an object is manufactured, and a supply device 18 that supplies a manufacturing material 16 to the table 14.

(Table)

The table 14 is supported by, for example, a drive table 20. The drive table 20 operates according to a drive signal from a control device 22. The control device 22 outputs the drive signal to the drive table 20 based on the shape data of the object. The drive table 20 drives the table 14 in an X-Y direction along a horizontal plane, a height direction (up direction UH and down direction DH), and a rotation direction according to the drive signal. Accordingly, the object is manufactured on the manufacturing surface 12 with the manufacturing material 16 delivered from the supply device 18 to the table 14.

In the present exemplary embodiment, a case where the object is manufactured by driving the table 14 based on the shape data is described. It is noted that the present disclosure is not limited to this case. For example, the supply device 18 may be driven by a manipulator based on the shape data to manufacture the object.

The supply device 18 includes a support shaft 30. A reel 32 is rotatably supported on the support shaft 30. The supply device 18 includes a change roller 34, a transport unit 36, and a cutting machine 38. The change roller 34 changes a delivery direction of the manufacturing material 16 delivered from the reel 32. The manufacturing material 16 whose delivery direction is changed by the change roller 34 is delivered to the transport unit 36. The cutting machine 38 cuts the manufacturing material 16 delivered from the transport unit 36. The supply device 18 further includes a manufacturing nozzle 40 and a pressure roller 42. The manufacturing nozzle 40 melts the manufacturing material 16 delivered from the cutting machine 38. The pressure roller 42 presses the manufacturing material 16 delivered from the manufacturing nozzle 40 to a target location.

(Reel)

The reel 32 holds the linear manufacturing material 16 in a wound state. The reel 32 holds the wound manufacturing material 16 in a drawable manner.

(Manufacturing Material)

The manufacturing material 16 contains plural continuous fibers and a resin impregnated into the continuous fibers. An example of the continuous fiber is a carbon fiber. The resin impregnated into the continuous fibers contains a thermoplastic resin. Accordingly, the manufacturing material 16 can be softened and deformed when being heated, and is cured at a room temperature to maintain its shape.

(Transport Unit)

The transport unit 36 is connected to the control device 22 and operates according to a transport signal from the control device 22. The transport unit 36 includes, for example, drive rollers that sandwich the manufacturing material 16 from both sides. When the drive rollers operate according to the transport signal, the transport unit 36 pulls out the manufacturing material 16 wound on the reel 32 and sends the manufacturing material 16 to the cutting machine 38.

(Cutting Machine)

The cutting machine 38 is an example of an elimination unit as hardware. The cutting machine 38 is connected to the control device 22 and operates according to a cutting signal from the control device 22.

The cutting machine 38 includes upstream rollers 46, downstream rollers 50, and a cutter 52. The upstream rollers 46 are disposed upstream 44 in a manufacturing material transport direction. The downstream rollers 50 are disposed downstream 48 in the manufacturing material transport direction. The cutter 52 is disposed between the upstream rollers 46 and the downstream rollers 50. The cutter 52 includes, for example, a shearing mechanism that shears the manufacturing material 16 passing therethrough. The cutter 52 shears the manufacturing material 16 when receiving the cutting signal from the control device 22.

(Manufacturing Nozzle)

The manufacturing nozzle 40 heats the manufacturing material 16 delivered from the cutting machine 38 to melt the resin of the manufacturing material 16. The manufacturing nozzle 40 delivers the molten manufacturing material 16 toward the target location.

Herein, the term "target location" covers a concept including the manufacturing surface 12 of the table 14 and a part on the manufacturing material 16 applied on the table 14. The term "part on the table 14" covers a concept including a part on the manufacturing surface 12 of the table 14 and the part on the manufacturing material 16 applied on the table 14.

(Pressure Roller)

The pressure roller 42 presses the manufacturing material 16 delivered from the manufacturing nozzle 40 to the target location, and fixes the manufacturing material 16 at the target location. The term "target location" and the term "part on the table 14" cover the above-described concepts.

Figure 2:
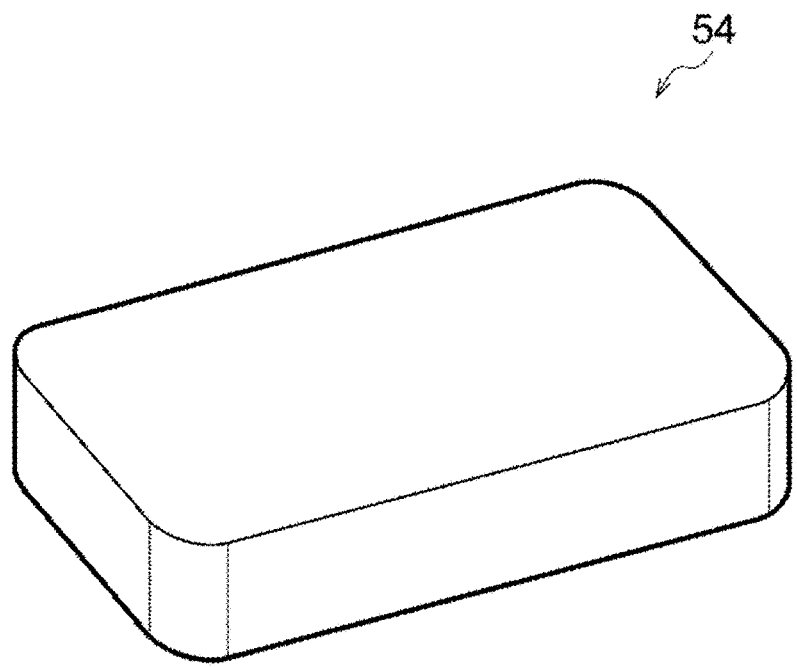
FIG. 2 is a perspective view illustrating an example of an object to be manufactured.
Figure 3:
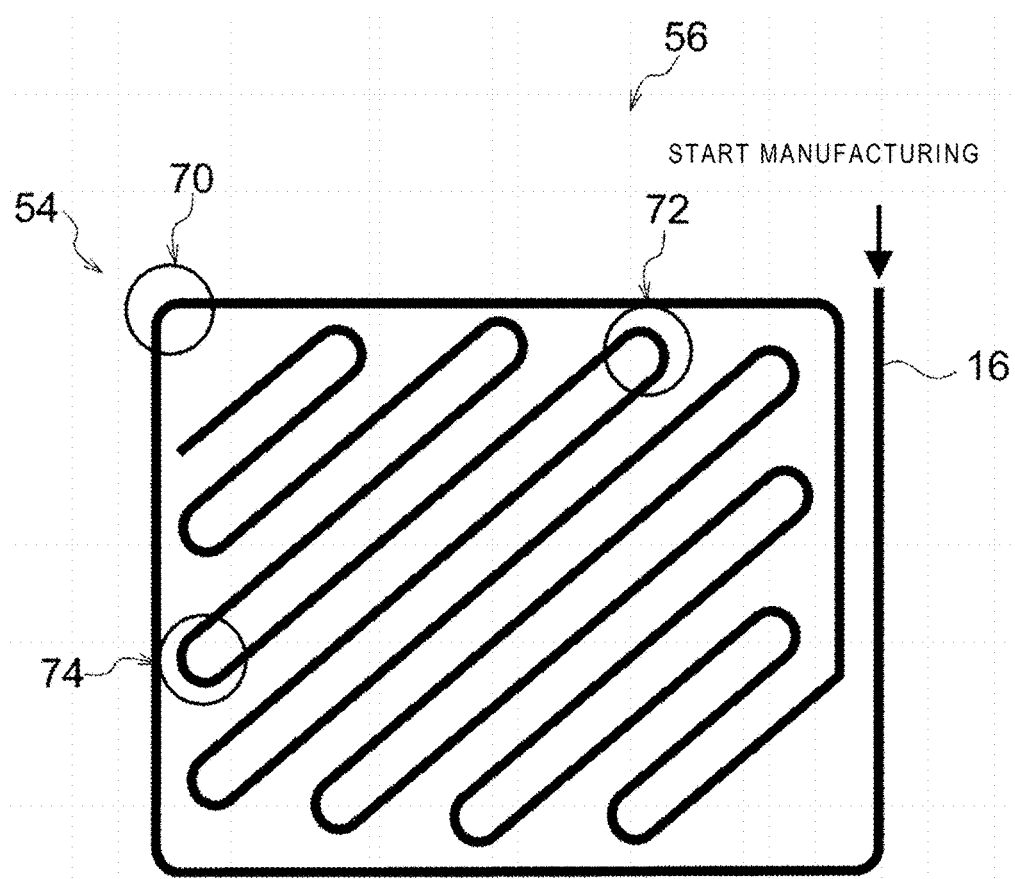
FIG. 3 is a diagram illustrating a procedure for manufacturing the object.

FIG. 2 is a diagram illustrating an example of an object 54 to be manufactured by the manufacturing apparatus 10. FIG. 3 is a diagram illustrating an application path 56 along which the manufacturing material 16 is applied when the object 54 is manufactured.

(Application Path)

The application path 56 indicates an application route calculated by the control device 22 based on the shape data of the object 54 when the object 54 is three-dimensionally manufactured. The manufacturing apparatus 10 manufactures the object 54 by applying the manufacturing material 16 along the application path 56.

Figure 4:
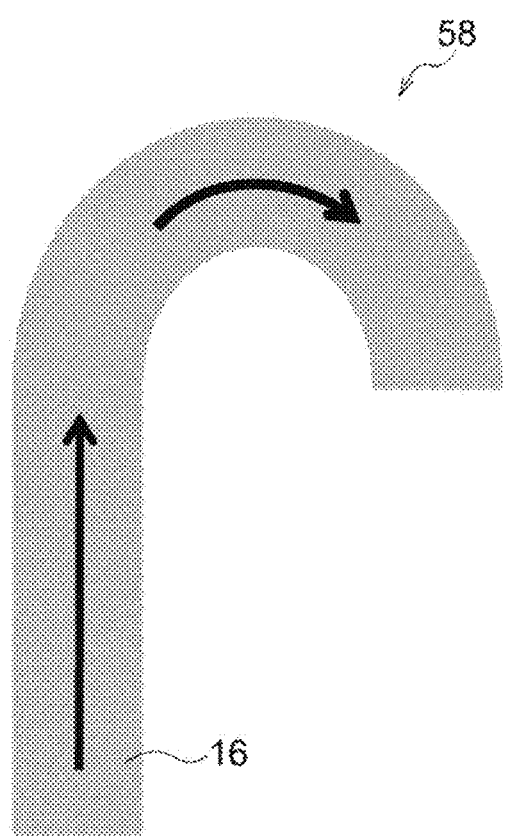
FIG. 4 is a diagram illustrating that an application direction of a manufacturing material is changed.

Plural locations where an application direction of the manufacturing material 16 is changed are set on the application path 56. FIG. 4 is a diagram illustrating a location 58 where the application direction of the manufacturing material 16 is changed and illustrates that the application direction of the manufacturing material 16 is changed 180 degrees to the right when viewed from the manufacturing apparatus 10.

(Control Device)

The control device 22 is configured with a microcomputer including a CPU serving as a processor, a ROM that stores a program showing a procedure in accordance with which the CPU processes, and a RAM. The control device 22 operates according to an operation of the microcomputer.

The ROM stores information on the manufacturing apparatus 10, information on the manufacturing material 16 to be used, and a twist limit of the manufacturing material 16.

[Information on Manufacturing Apparatus]

In the manufacturing apparatus 10 illustrated in FIG. 1, a distance from a reel outlet 60, indicating a position of the manufacturing material 16 delivered from the reel 32, to the downstream rollers 50 disposed on the manufacturing nozzle 40 side is 1,000 mm. The ROM stores this distance as the information on the manufacturing apparatus 10.

[Information on Manufacturing Material]

The ROM stores the information on the manufacturing material 16 to be used.

Specifically, the information on the manufacturing material 16 to be used includes a shape, a material, and physical property values of the manufacturing material 16 to be used. In the present exemplary embodiment, the manufacturing material 16 has a diameter of 0.6 mm and a Vf value, indicating a volume ratio of the continuous fibers contained in the manufacturing material 16, of 45%. The continuous fibers constituting the manufacturing material 16 contain 3,000 carbon fibers. The resin constituting the manufacturing material 16 contains 57% of polypropylene (PP), 39% of polyamide (PA), and 4% of maleic PP. The ROM stores these pieces of information on the manufacturing material 16.

[Twist Limit]

The inventors finds that in a case of manufacturing the object 54 by the manufacturing apparatus 10 having the above configuration with the manufacturing material 16 described above, if an accumulation amount of a twisting force generated in the manufacturing material 16 is larger than a specified value (allowable value), the transport of the manufacturing material 16 may be hindered and a manufacturing process may be hindered.

Herein, a specific example of hindering the manufacturing process is that the applied manufacturing material 16 is distorted or broken, which may result in that the strength of the manufacturing material 16 is reduced.

For the manufacturing apparatus 10, experiments show that in a case where a minimum radius of curvature in the application path 56 is 150 mm and the application direction is changed to the right or left, when a rotation angle in one of the right and left directions exceeds 3,600 degrees (that is, the accumulated number of rotations exceeds 10 rotations), the transport of the manufacturing material 16 or the manufacturing process is hindered.

Therefore, when the application direction is changed to the right and left, accumulated rotation angles in the right and left directions are regarded as right and left direction change amounts, respectively, and the respective accumulated numbers of rotations are regarded as the numbers of changes in the right and left directions. A twist limit of the right and left direction change amounts indicating the accumulated rotation angles is set to 3,600 degrees, and a twist limit of the numbers of changes in the right and left directions indicating the accumulated numbers of rotations is set to 10 rotations. The above twist limits are stored in the ROM.

It is noted that 3,600 degrees, which indicates the right and left direction change amounts indicating the accumulated rotation angles, indicates a threshold value. This threshold value may be referred to as a specified value (allowable value). Further, 10 rotations, which indicate the numbers of changes in the right and left directions indicating the accumulated numbers of rotations, indicates a threshold value. This threshold value may be referred to as a specified value (allowable value).

In order to eliminate the twisting force generated in the manufacturing material 16 before the threshold value is exceeded, a value smaller than the threshold value is set as a determination reference value. For example, the determination reference value is set to 3,420 degrees (9.5 rotations), which is 180 degrees (half rotation) smaller than 3,600 degrees (10 rotations) which is the right and left direction change amounts. The determination reference value is stored in the ROM.

Each of the right and left direction change amounts indicating the accumulated rotation angles in the right and left directions is obtained by adding a rotation angle in the same direction and subtracting a rotation angle in an opposite direction. Further, each of the numbers of changes in the right and left directions indicating the accumulated numbers of rotations is obtained by adding a rotation number in the same direction and subtracting a rotation number in the opposite direction.

In the present exemplary embodiment, the twist limit of the manufacturing material 16 is determined based on the information on the manufacturing apparatus 10 and the information on the manufacturing material 16 described above. It is noted that the present disclosure is not limited thereto. For example, the twist limit may be determined based on the following parameters.

[Condition Parameters Influencing Estimation Accuracy of Twisting Force]

It is known that accuracy of the following condition parameters varies depending on a difference (error) between an estimated value and an actual value. It is possible to determine the twist limit using the following condition parameters.

Manufacturing Material: a resin composition, a diameter, the number of continuous fibers, a material of continuous fiber, a Vf value, and a moisture absorption rate Manufacturing Condition: a manufacturing speed (a consumed length of a manufacturing material per hour) and a melting temperature Environment: an ambient temperature and an ambient humidity (Flowchart)

Figure 5:
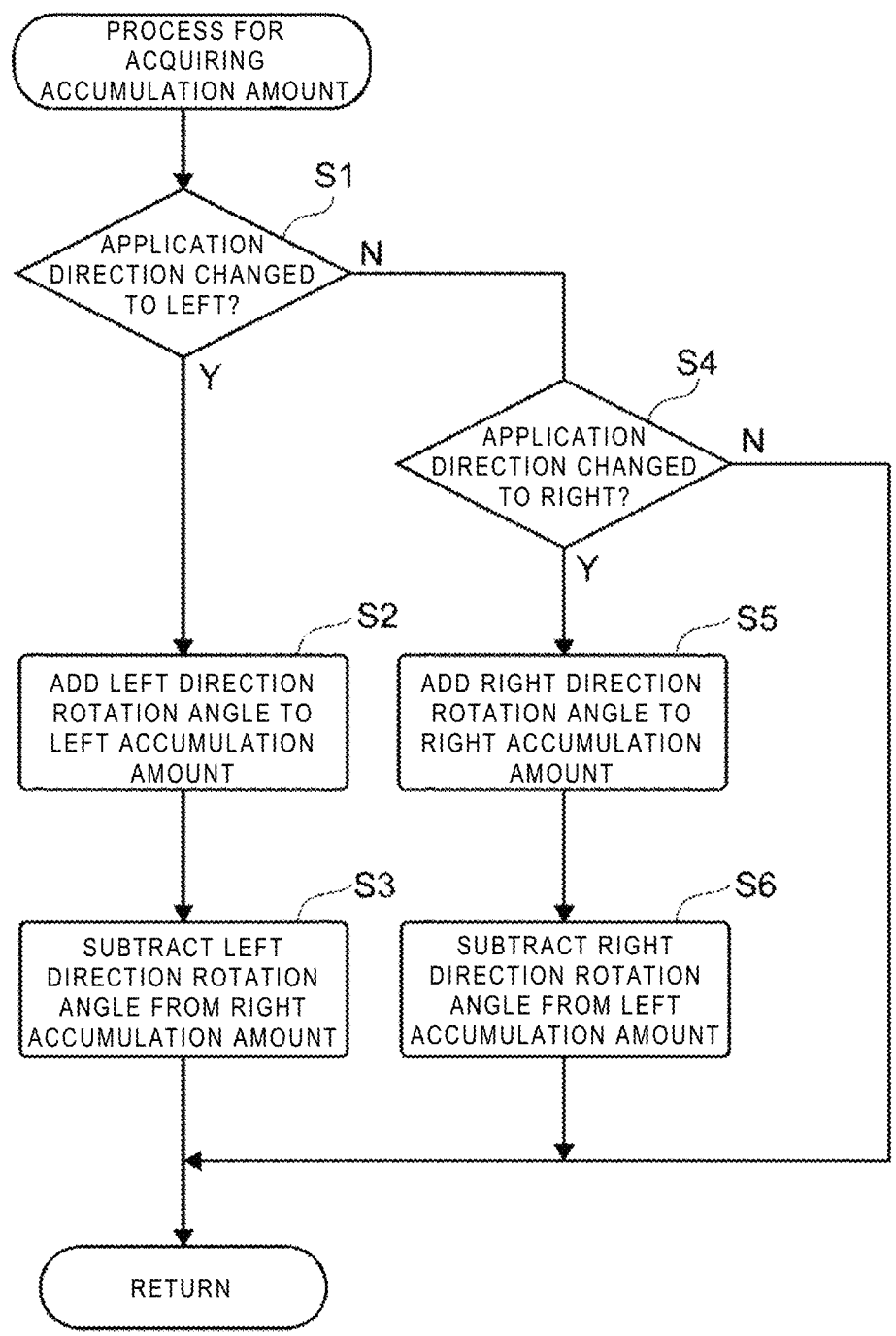
FIG. 5 is a flowchart of a process for acquiring an accumulation amount.
Figure 6:
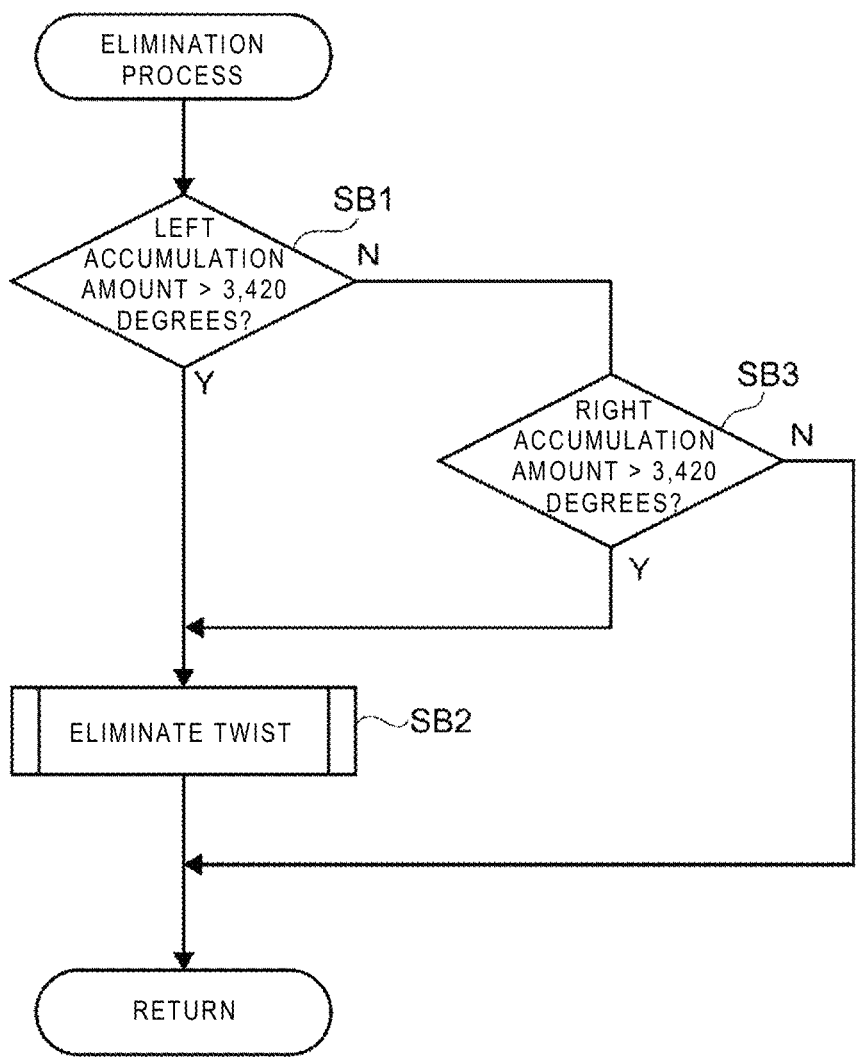
FIG. 6 is a flowchart of an elimination process.
Figure 7:
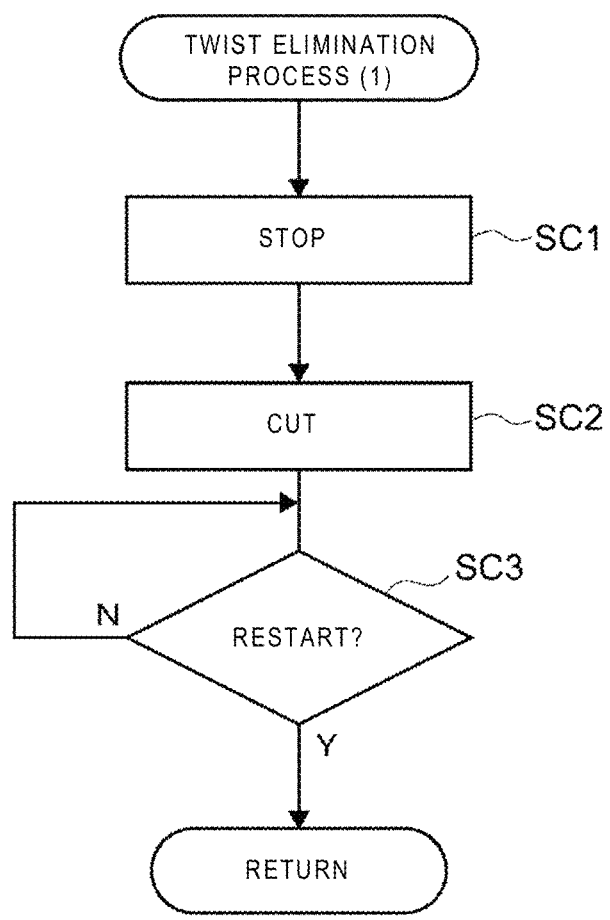
FIG. 7 is a flowchart of a twist elimination process (1)

FIGS. 5 to 7 are flowcharts illustrating operations of the present exemplary embodiment. The operations of the manufacturing apparatus 10 will be described according to the flowcharts.

The CPU of the microcomputer constituting the control device 22 starts an operation according to the program stored in the ROM. When a process for acquiring an accumulation amount is called from the manufacturing process for performing the manufacturing, the process for acquiring an accumulation amount is executed as illustrated in FIG. 5.

The process for acquiring an accumulation amount implements an acquisition unit that acquires information relating to the accumulation amount of the twisting force generated in the manufacturing material 16 during applying, so as to acquire the information relating to the accumulation amount based on the application path 56 along which the manufacturing material 16 is applied.

(Process for Acquiring Accumulation Amount)

In the process for acquiring an accumulation amount, it is determined whether the application direction of the manufacturing material 16 is changed to the left during the manufacturing, based on data of the application path 56 along which the manufacturing material 16 is applied (S1). When it is determined in the step S1 that the application direction is changed to the left, a rotation angle to the left direction is added to a left accumulation amount (left direction change amount) stored in the RAM (S2). Then, the rotation angle to the left direction is subtracted from a right accumulation amount (right direction change amount) stored in the RAM (S3), and the flow returns to a routine that has called the process for acquiring an accumulation amount.

The left accumulation amount indicating the information relating to the accumulation amount is the left direction change amount on the application path 56 along which the manufacturing material 16 is applied. It is noted that the left accumulation amount is 0 in an initial state. Each accumulation amount may have a negative value.

The left accumulation amount indicating the direction change amount may be the number of changes in the left direction. In this case, the number of changes in the left direction is added to the left accumulation amount, and the number of changes in the left direction is subtracted from the right accumulation amount.

When it is determined in the step S1 that the application direction is not changed to the left, it is determined whether the application direction of the manufacturing material 16 is changed to the right based on the data of the application path 56 along which the manufacturing material 16 is applied (S4). When it is determined in the step S4 that the application direction is not changed to the right, the flow returns to the routine that has called the process for acquiring an accumulation amount. On the other hand, when it is determined in the step S4 that the application direction is changed to the right, a rotation angle to the right direction is added to the right accumulation amount (right direction change amount) stored in the RAM (S5). Then, the rotation angle to the right direction is subtracted from the left accumulation amount (left direction change amount) stored in the RAM (S6), and the flow returns to the routine that has called the process for acquiring an accumulation amount.

The right accumulation amount indicating the information relating to the accumulation amount is the right direction change amount on the application path 56 along which the manufacturing material 16 is applied. It is noted that the right accumulation amount is 0 in the initial state.

The right accumulation amount indicating the direction change amount may be the number of changes in the right direction. In this case, the number of changes in the right direction is added to the right accumulation amount, and the number of changes in the right direction is subtracted from the left accumulation amount.

(Elimination Process)

When elimination process that constitutes a part of the elimination unit as software is called from the manufacturing process for performing the manufacturing, the elimination process is executed as illustrated in FIG. 6. This elimination process performs a part of an elimination process for eliminating the twisting force generated in the manufacturing material 16 based on the information relating to each accumulation amount.

In the elimination process, it is determined whether the left accumulation amount exceeds 3,420 degrees (SB1). 3,420 degrees is the above-mentioned determination reference value and is stored in the ROM. In step SB1, it is determined whether the information relating to the accumulation amount exceeds the determination reference value.

As described above, the determination reference value is determined based on the information on the manufacturing apparatus 10 and the information on the manufacturing material 16 to be used. Therefore, in the elimination process, it is determined whether to eliminate the twisting force based on the information relating to the accumulation amount and the information on the manufacturing material by using the above-mentioned determination reference value.

In the present exemplary embodiment, it is determined whether to eliminate the twisting force by using the left accumulated rotation angle indicating the left direction change amount. It is noted that the present disclosure is not limited thereto. For example, whether to eliminate the twisting force may be determined by using the number of changes in the left direction as the left accumulation amount. In this case, the determination reference value is 9.5 rotations.

When it is determined in the step SB1 that the left accumulation amount exceeds 3,420 degrees, a twist elimination process is executed (SB2) and then the flow returns to a routine that has called the elimination process. Accordingly, the twisting force is eliminated before the information relating to the accumulation amount exceeds the preset threshold value (3,600 degrees).

When it is determined in the step SB1 that the left accumulation amount does not exceed 3,420 degrees, the flow proceeds to a step SB3. In the step SB3, it is determined whether the right accumulation amount exceeds 3,420 degrees (SB3). Herein, 3,420 degrees indicates the determination reference value and is stored in the ROM. In the step SB3, it is determined whether the information relating to the accumulation amount exceeds the determination reference value.

As described above, the determination reference value is determined based on the information on the manufacturing apparatus 10 and the information on the manufacturing material 16 to be used which are stored in the ROM. Therefore, in the elimination process, it is determined whether to eliminate the twisting force based on the information relating to the accumulation amount and the information on the manufacturing material 16 by using the above-mentioned determination reference value.

When it is determined in the step SB3 that the right accumulation amount does not exceed 3,420 degrees, the flow returns to the routine that has called the elimination process. When it is determined in the step SB3 that the right accumulation amount exceeds 3,420 degrees, the twist elimination process is executed (SB2) and then the flow returns to the routine that has called the elimination process. Accordingly, the twisting force is eliminated before the information relating to the accumulation amount exceeds the preset threshold value (3,600 degrees).

In the present exemplary embodiment, it is determined whether to eliminate the twisting force by using the right accumulated rotation angle indicating the right direction change amount. It is noted that the present disclosure is not limited thereto. For example, whether to eliminate the twisting force may be determined by using the number of changes in the right direction as the right accumulation amount. In this case, the determination reference value is 9.5 rotations.

(Twist Elimination Process (1))

Next, when the twist elimination process that constitutes a part of the elimination unit as software is called from the elimination process, a twist elimination process (1) is executed as illustrated in FIG. 7. The twist elimination process (1) performs a part of the elimination process for eliminating the twisting force generated in the manufacturing material 16 based on the information relating to each accumulation amount.

In the twist elimination process (1), the manufacturing process is temporarily stopped in the manufacturing apparatus 10 (SC1), the cutter 52 of the cutting machine 38 is operated to cut the manufacturing material 16 passing therethrough (SC2), and then the manufacturing apparatus 10 waits until a restart button provided, for example, in the manufacturing apparatus is operated (SC3).

Cutting the manufacturing material 16 eliminates the accumulated twisting force, so that the twisting force becomes 0. Accordingly, the twisting force is eliminated based on the information relating to the accumulation amount. At this time, the left accumulation amount and the right accumulation amount are reset to 0.

At this time, a user of the manufacturing apparatus 10 passes the cut manufacturing material 16 through the manufacturing nozzle 40 so that a tip end of the manufacturing material 16 is pressed by the pressure rollers 42, and operates the restart button.

Then, the waiting state in the step SC3 is released, and the flow returns to a routine that has called the elimination process (1).

The manufacturing material 16 is cut, for example, at a direction change portion 70 illustrated in FIG. 3 to eliminate the twisting force.

When it is difficult to cut the manufacturing material 16 and restart the applying at the direction change portion 70, the manufacturing material 16 is cuts and the applying is restarted before the direction change portion 70. When the accumulation amount is expected to exceed the determination reference, the manufacturing material 16 is cut and the applying is restarted at the direction change portion 70 or at a position before or after the direction change portion 70 where the accumulation amount does not exceed the twist limit of the manufacturing material 16.

(Operations and Effects)

Operations and effects of the present exemplary embodiment having the above configuration will be described.

The manufacturing apparatus 10 according to the present exemplary embodiment acquires the information relating to the accumulation amount of the twisting force generated in the manufacturing material 16, and eliminates the twisting force based on the information relating to the accumulation amount.

Therefore, the twisting force accumulated in the manufacturing material 16 can be reduced as compared with a case where the manufacturing is continued regardless of a twisted state of the manufacturing material 16.

Reducing the twisting force prevents an adverse influence on the transport of the manufacturing material 16 and the manufacturing process. Accordingly, the applied manufacturing material 16 is prevented from being distorted or broken, and the reduction in the strength of the manufacturing material 16 is prevented.

As compared with a case where the twisting force is reduced regardless of the accumulation amount of the twisting force, the twisting force can be eliminated according to the accumulated twisting force, and a manufacturing time before the elimination can be easily secured.

The twisting force is eliminated before the information relating to the accumulation amount exceeds the preset threshold value (3,600 degrees).

Therefore, as compared with a case where the twisting force is eliminated after the threshold value is exceeded, it is possible to prevent the adverse influence on the object 54. The adverse influence on the object 54 is, for example, an adverse influence on dimensional accuracy and the strength of the object 54.

The information relating to the accumulation amount is acquired based on the application path 56 along which the manufacturing material 16 is applied.

Therefore, a member cost is reduced as compared with a case where a detector is used.

The information relating to the accumulation amount is the right and left direction change amounts on the application path 56.

Accordingly, the information relating to the accumulation amount can be acquired from the right and left direction change amounts on the application path 56.

Further, by using the numbers of changes in the right and left directions as the direction change amount, the direction change amount can be acquired from the numbers of changes in the right and left directions.

The twisting force is eliminated based on the information relating to the accumulation amount and the information on the manufacturing material 16.

Therefore, as compared with a case where the twisting force is eliminated only based on the accumulation amount, it is possible to prevent the adverse influence on the object 54. The adverse influence on the object 54 is, for example, an adverse influence on dimensional accuracy and the strength of the object 54.

The manufacturing apparatus 10 cuts the manufacturing material 16 to eliminate the twisting force.

Therefore, a time required to eliminate the twisting force can be shortened as compared with a case where the twisting force is eliminated by adjusting the application path 56 along which the manufacturing material 16 is applied.

Further, as compared with a case where the twisting force is eliminated by cooling the manufacturing material 16 after heating the manufacturing material at a high temperature, energy efficiency can be improved and the twist elimination time can be shortened.

Second Exemplary Embodiment

Figure 9:
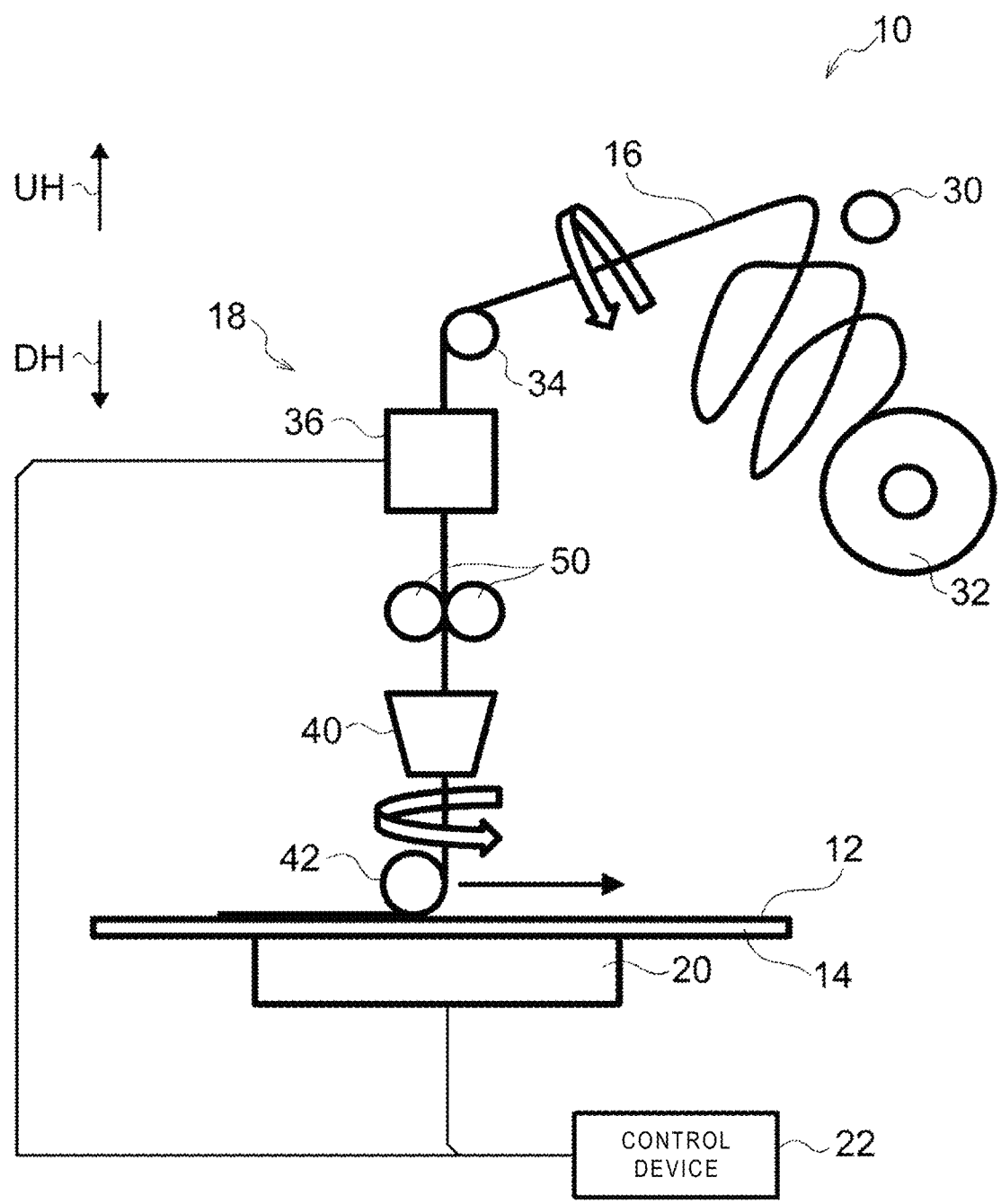
FIG. 9 is a schematic diagram illustrating a manufacturing apparatus according to a second exemplary embodiment.

FIG. 9 is a diagram illustrating a second exemplary embodiment. The same or equivalent elements as those of the first exemplary embodiment will be designated by the same reference numerals, the description thereof will be omitted, and the following description will focus on differences. The manufacturing apparatus 10 according to the present exemplary embodiment is different in that the twist elimination process (1) called from the elimination process illustrated in FIG. 6 is changed to a twist elimination process (2).

(Twist Elimination Process (2))

Figure 8:
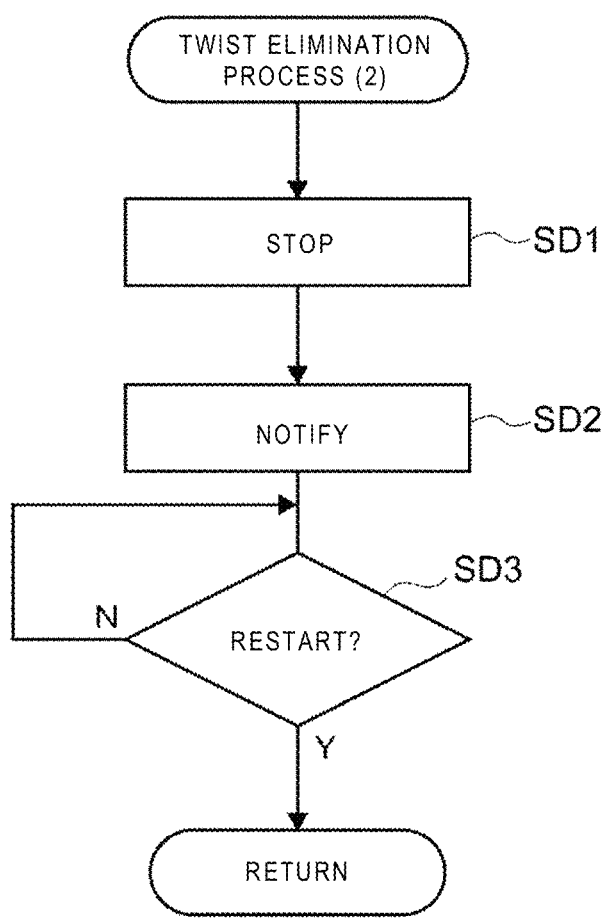
FIG. 8 is a flowchart of a twist elimination process (2)

That is, when a twist elimination process that constitutes a part of the elimination unit as software is called from the elimination process, the twist elimination process (2) is executed as illustrated in FIG. 8. The twist elimination process (2) performs a part of the elimination process for eliminating the twisting force generated in the manufacturing material 16 based on information relating to each accumulation amount.

In the twist elimination process (2), the manufacturing process is temporarily stopped (SD1) in the manufacturing apparatus 10, for example, a buzzer provided in the manufacturing apparatus 10 is sounded to notify the user that the twisting force exceeds the determination reference value (SD2), and then the manufacturing apparatus 10 waits until the restart button is operated (SD3). The notification to the user may be referred to as a notice to the user.

At this time, as illustrated in FIG. 9, the user who is notified that the twisting force exceeds the determination reference value removes the reel 32 from the support shaft 30 and rotates the reel 32, thereby eliminating the twisting force generated in the manufacturing material 16. Then, the user sets the reel 32 on the support shaft 30, and then operates the restart button provided on the manufacturing apparatus 10.

Then, the waiting state in the step SD3 is released, and the flow returns to a routine that has called the elimination process (2).

In the present exemplary embodiment, the case where the user manually eliminates the twisting force of the manufacturing material 16 has been described. It is noted that the present disclosure is not limited thereto. For example, the manufacturing apparatus 10 may automatically rotate the reel 32 to eliminate the twisting force generated in the manufacturing material 16.

(Operations and Effects)

In the present exemplary embodiment having the above configuration, similar operations and effects as those of the first exemplary embodiment can be achieved.

Third Exemplary Embodiment

Figure 10:
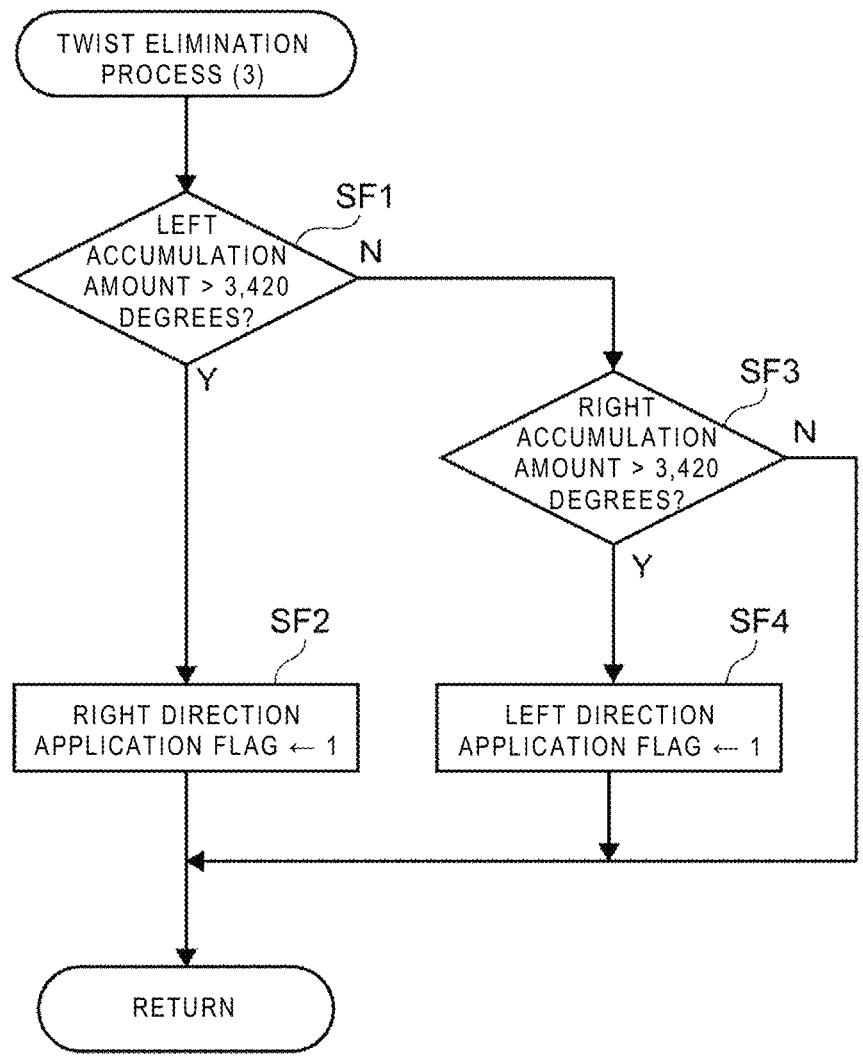
FIG. 10 is a flowchart of a twist elimination process (3)
Figure 11:
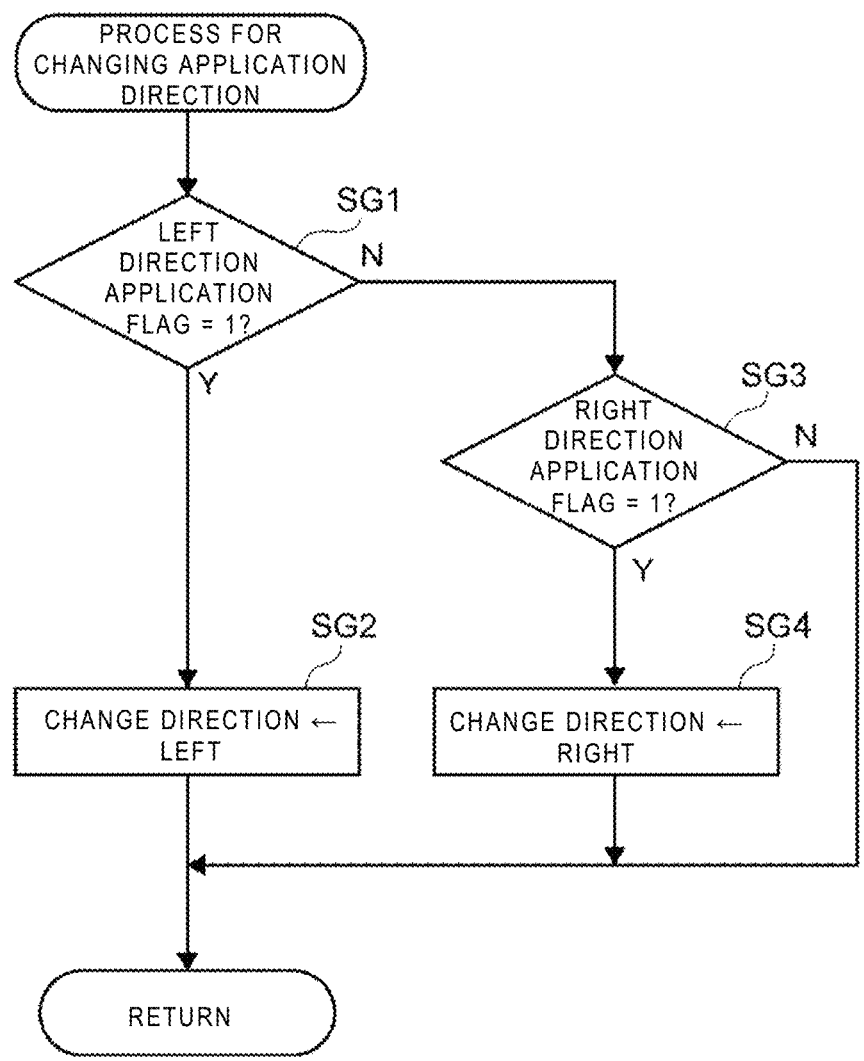
FIG. 11 is a flowchart of a process for changing an application direction according to a third exemplary embodiment.

FIGS. 10 and 11 are diagrams illustrating a third exemplary embodiment. The same or equivalent elements as those of the first exemplary embodiment will be designated by the same reference numerals, the description thereof will be omitted, and the following description will focus on differences. The manufacturing apparatus 10 according to the present exemplary embodiment is different in that the twist elimination process (1) called from the elimination process illustrated in FIG. 6 is changed to a twist elimination process (3).

(Twist Elimination Process (3))

That is, when a twist elimination process that constitutes a part of the elimination unit as software is called from the elimination process, the twist elimination process (3) is executed as illustrated in FIG. 10. The twist elimination process (3) performs a part of the elimination process for eliminating the twisting force generated in the manufacturing material 16 based on information relating to each accumulation amount.

In the twist elimination process (3), it is determined whether the left accumulation amount exceeds 3,420 degrees (SF1).

When it is determined in the step SF1 that the left accumulation amount exceeds 3,420 degrees, "1" is set to a right direction application flag stored in the RAM (SF2), and the flow returns to a routine that has called the twist elimination process (3).

The right direction application flag is "0" in an initial state. The right direction application flag of "1" indicates that when the application direction is next changed, the application direction is right.

When it is determined in the step SF1 that the left accumulation amount does not exceed 3,420 degrees, it is determined whether the right accumulation amount exceeds 3,420 degrees (SF3). When it is determined that the right accumulation amount does not exceed 3,420 degrees, the flow returns to the routine that has called the twist elimination process (3).

When it is determined in the step SF3 that the right accumulation amount exceeds 3,420 degrees, "1" is set to a left direction application flag stored in the RAM (SF4), and the flow returns to the routine that has called the twist elimination process (3).

The left direction application flag is "0" in an initial state. The left direction application flag of "1" indicates that when the application direction is next changed, the application direction is left.

(Process for Changing Application Direction)

FIG. 11 is a flowchart illustrating a process for changing an application direction. The process for changing an application direction constitutes a part of the elimination unit as software, and eliminates the twisting force by changing the application path 56 along which the manufacturing material 16 is applied based on the information relating to the accumulation amount so as to reduce the twisting force.

That is, when the process for changing an application direction is called before the application direction is changed in an application process for applying the manufacturing material 16, it is determined whether the left direction application flag is "1" (SG1) as illustrated in FIG. 11.

When it is determined in the step SG1 that the left direction application flag is "1", a change direction is set to the "left" (SG2), and the flow returns to a routine that has called the process for changing an application direction.

Then, the application process sets the application path 56 such that the application direction is left as indicated by a left change portion 72 in FIG. 3. Accordingly, it is possible to reduce the twisting force accumulated in the manufacturing material 16.

When it is determined in the step SG1 that the left direction application flag is not "1", it is determined whether the right direction application flag is "1" (SG3). When it is determined that the right direction application flag is not "1", the flow returns to the routine that has called the process for changing an application direction.

When it is determined in the step SG3 that the right direction application flag is "1", the change direction is set to the "right" (SG4), and the flow returns to the routine that has called the process for changing an application direction.

Then, the application process sets the application path 56 such that the application direction is right as indicated by a right change portion 74 in FIG. 3. Accordingly, it is possible to reduce the twisting force accumulated in the manufacturing material 16.

(Operations and Effects)

In the present exemplary embodiment having the above configuration, similar operations and effects as those of the first exemplary embodiment can be achieved.

In the manufacturing apparatus 10 of the present exemplary embodiment, the twisting force is eliminated by changing the application path 56 along which the manufacturing material 16 is applied based on the information relating to the accumulation amount so as to reduce the twisting force.

Therefore, a cost can be reduced as compared with a case where a cutting device is used to cut the manufacturing material 16.

Fourth Exemplary Embodiment

Figure 12:
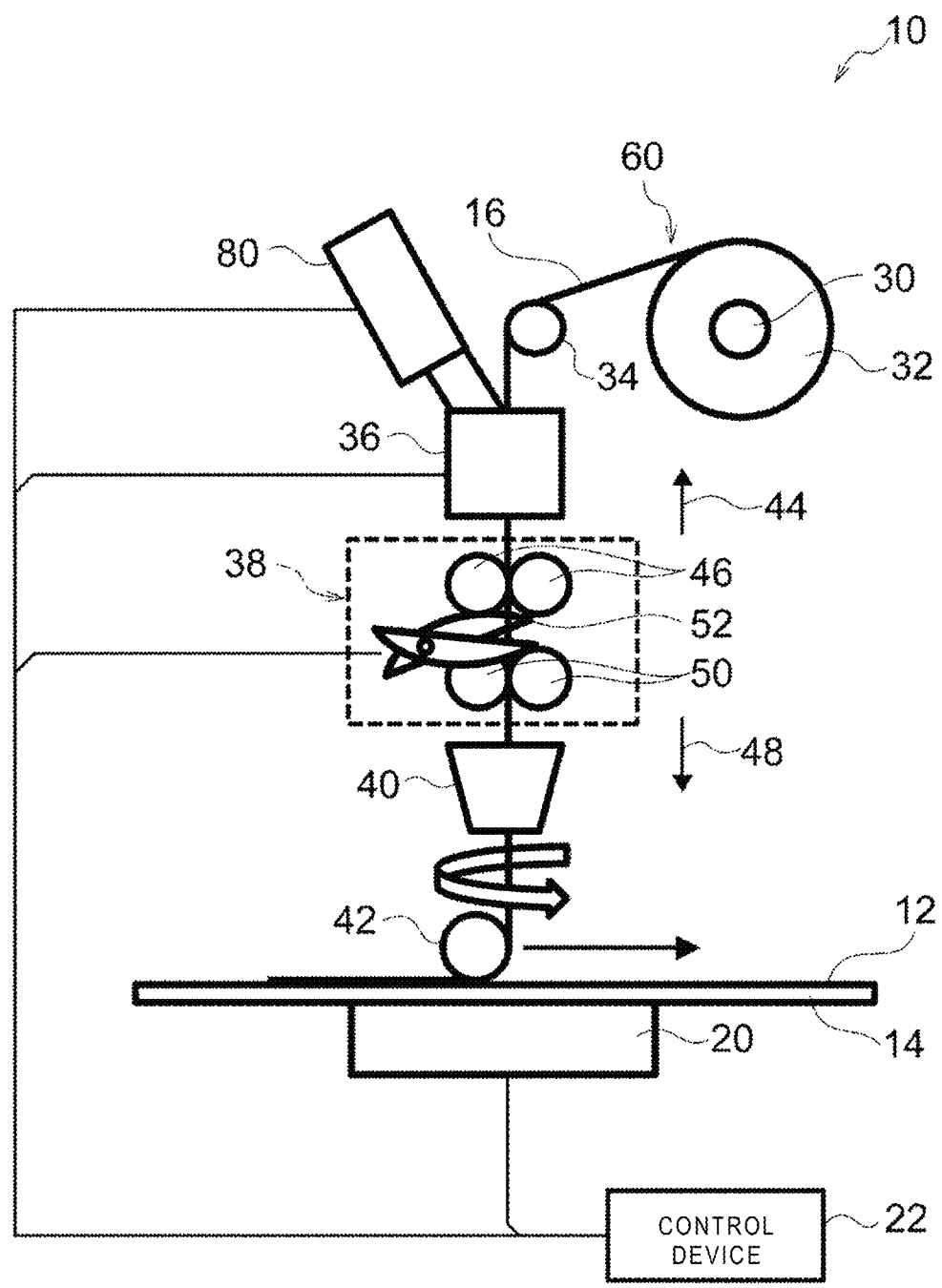
FIG. 12 is a schematic diagram illustrating a manufacturing apparatus according to a fourth exemplary embodiment.

FIG. 12 is a diagram illustrating a fourth exemplary embodiment. The same or equivalent elements as those of the first exemplary embodiment will be designated by the same reference numerals, the description thereof will be omitted, and the following description will focus on differences. The manufacturing apparatus 10 according to the present exemplary embodiment is different from the above-mentioned exemplary embodiments in an acquisition unit that acquires the information relating to the accumulation amount of the twisting force generated in the manufacturing material 16 during the applying.

That is, the transport unit 36 of the manufacturing apparatus 10 is provided with a detector 80 that detects a twisted state of the manufacturing material 16. The manufacturing apparatus 10 acquires the information relating to the accumulation amount based on the twisted state detected by the detector 80.

(Detector)

Figure 13:
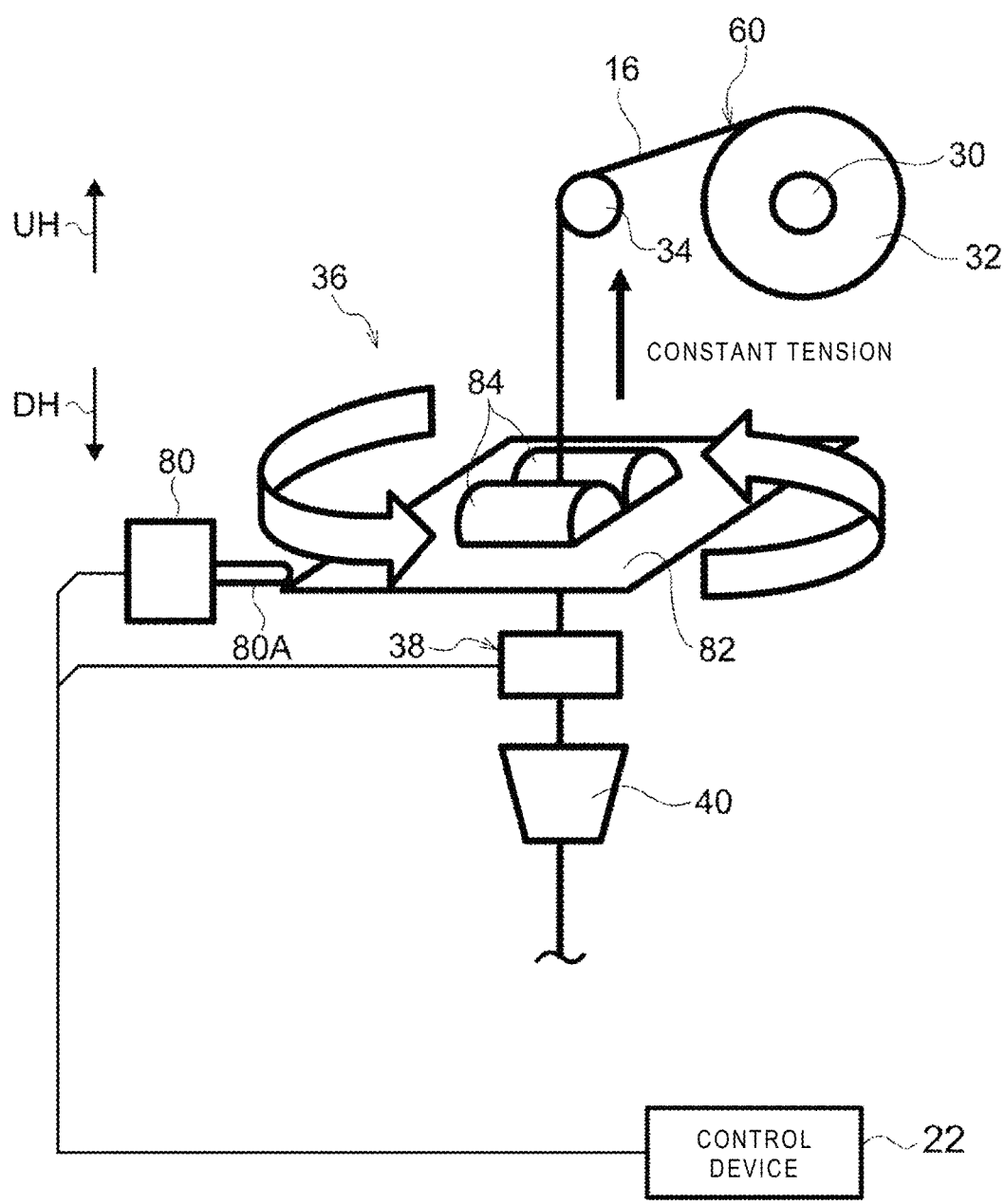
FIG. 13 is a schematic diagram illustrating a detector according to the fourth exemplary embodiment.

As illustrated in FIG. 13, the detector 80 includes, for example, a base plate 82 and a pair of drive rollers 84 rotatably supported on the base plate 82.

The drive rollers 84 sandwich the manufacturing material 16 from both sides and pull out the manufacturing material 16 wound on the reel 32 and send the manufacturing material 16 to the cutting machine 38 by rotating according to a transport signal from the control device 22.

The base plate 82 is rotatably supported along a horizontal plane that intersects a transport direction of the manufacturing material 16, and rotates by receiving the twisting force of the manufacturing material 16. A contact 80A of the detector 80 is connected to the base plate 82. The detector 80 measures a rotational force received from the base plate 82. Accordingly, the detector 80 detects the twisted state by measuring the twisting force generated in the manufacturing material 16 in the twist direction.

The detector 80 outputs the measured twisting force to the control device 22. The control device 22 uses the twisting force from the detector 80 as the information relating to the accumulation amount, and determines whether the information relating to the accumulation amount indicated by the twisting force exceeds the determination reference value smaller than the preset threshold value.

As described above, the threshold value indicates a magnitude of the twisting force that may hinder the transport of the manufacturing material 16 or the manufacturing process when the accumulation amount of the twisting force generated in the manufacturing material 16 is larger. The threshold value may be referred to as a twist limit value. The threshold value is determined based on the information on the manufacturing apparatus 10 and the information on the manufacturing material 16 described above.

When it is determined that the information relating to the accumulation amount indicated by the twisting force exceeds the determination reference value smaller than the threshold value, the cutting machine 38 cuts the manufacturing material 16 to eliminate the twisting force in a similar manner to the case illustrated in FIG. 7. Alternatively, as illustrated in FIGS. 8 and 9, the user is prompted to rotate the reel 32 to eliminate the twisting force. Alternatively, as illustrated in FIGS. 10 and 11, the application path 56 along which the manufacturing material 16 is applied is set to reduce the twisting force of the manufacturing material 16, to thereby eliminate the twisting force.

Accordingly, the twisting force is eliminated before the information relating to the accumulation amount exceeds the preset threshold value.

(Operations and Effects)

In the present exemplary embodiment having the above configuration, similar operations and effects as those of the first exemplary embodiment can be achieved.

The manufacturing apparatus 10 of the present exemplary embodiment includes the detector 80 that detects the twisted state of the manufacturing material 16, and acquires the information relating to the accumulation amount based on the twisted state detected by the detector 80.

Therefore, detection accuracy is improved as compared with a case where the accumulation amount is acquired based on the application path along which the manufacturing material 16 is applied.

The detector 80 detects the twisted state by measuring the force in the twist direction generated in the manufacturing material 16.

Therefore, the detection accuracy is improved as compared with a case where the twisted state is detected based on an appearance of the manufacturing material 16.

Fifth Exemplary Embodiment

Figure 14:
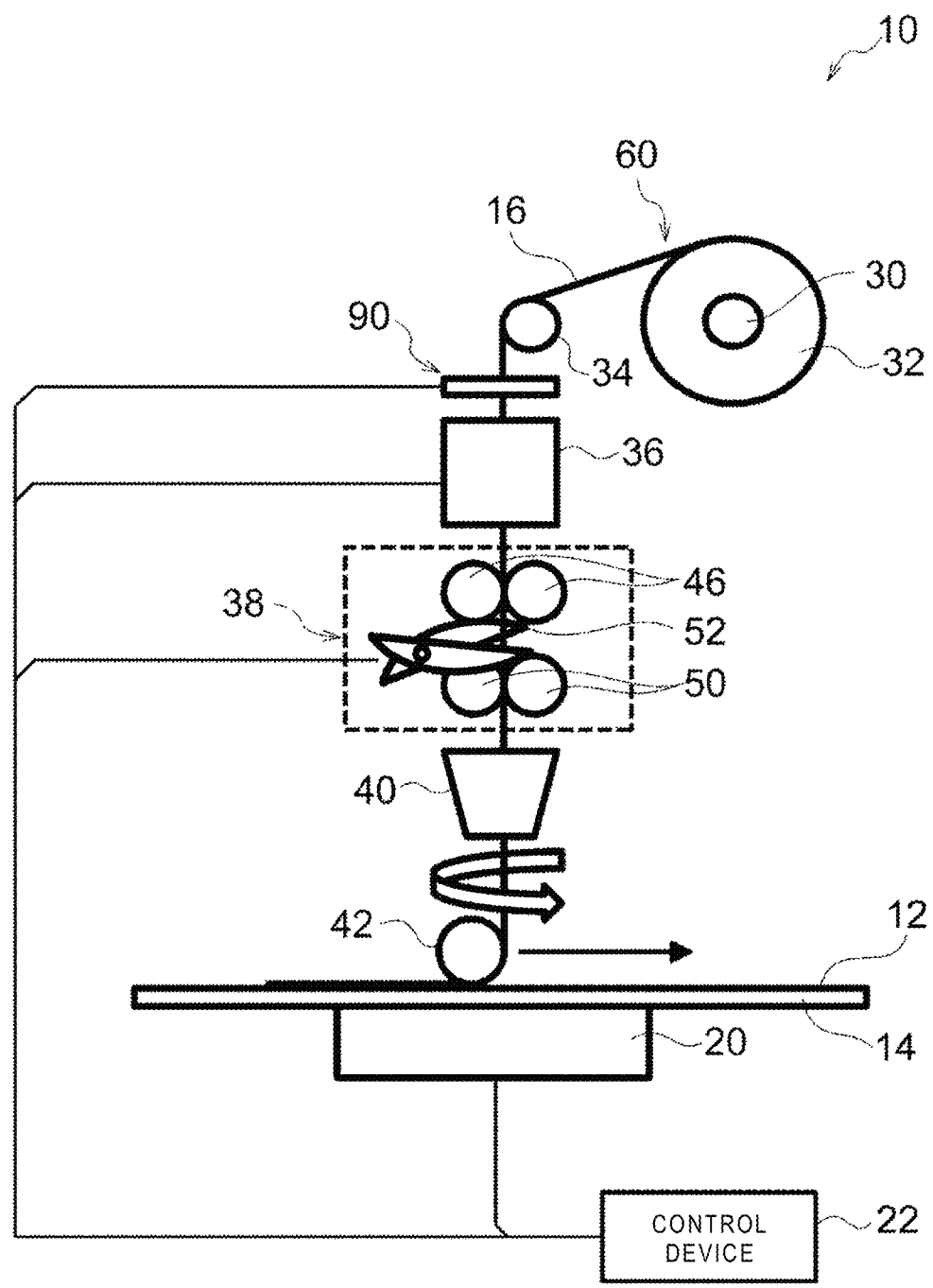
FIG. 14 is a schematic diagram illustrating a manufacturing apparatus according to a fifth exemplary embodiment.
Figure 15:
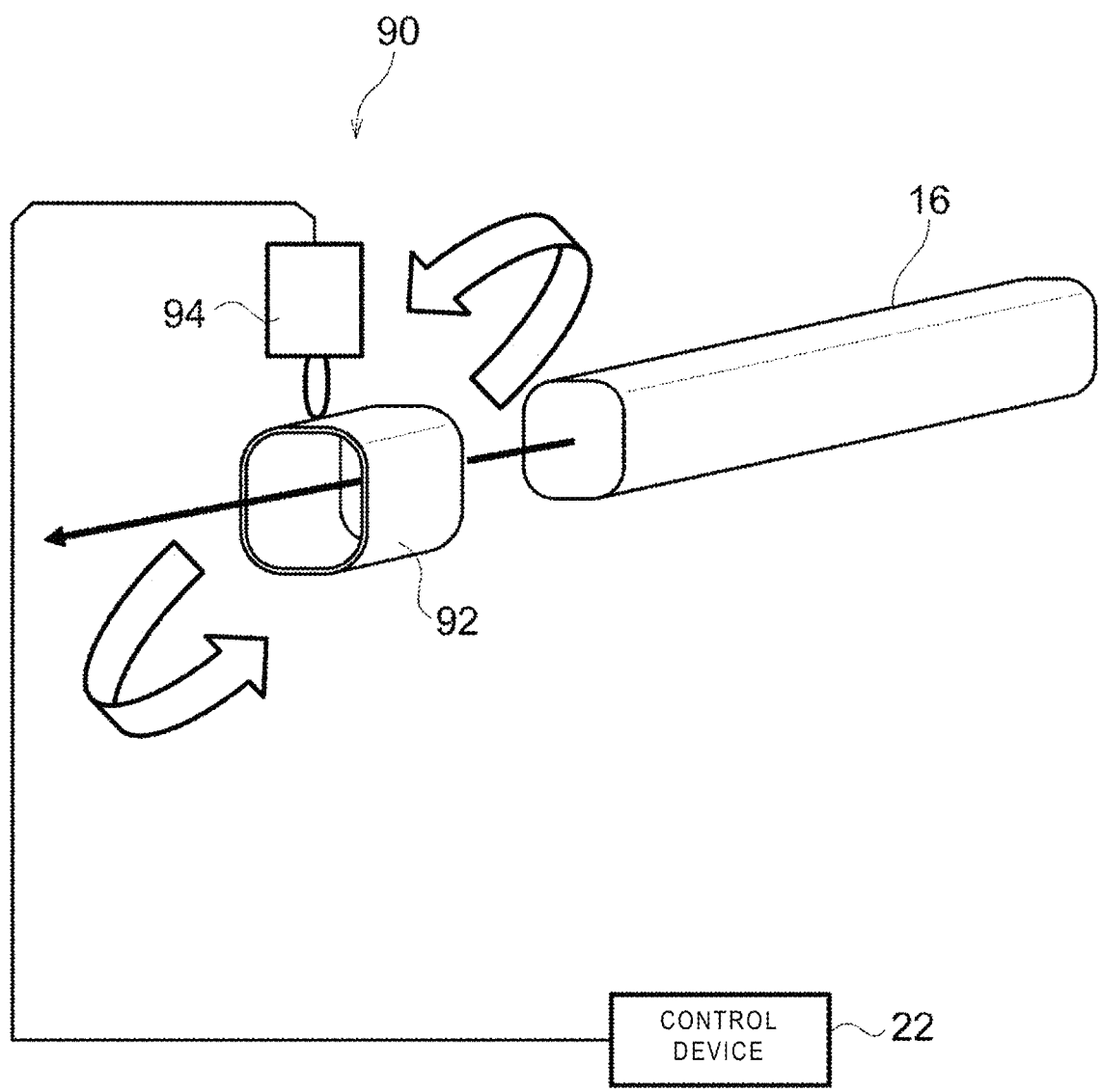
FIG. 15 is a schematic diagram illustrating a detector according to the fifth exemplary embodiment.

FIGS. 14 and 15 are diagrams illustrating a fifth exemplary embodiment. The same or equivalent elements as those of the fourth exemplary embodiment will be designated by the same reference numerals, the description thereof will be omitted, and the following description will focus on differences. The manufacturing apparatus 10 according to the present exemplary embodiment is different from the fourth exemplary embodiment in a detector 90 that detects the twisted state of the manufacturing material 16.

As illustrated in FIG. 14, the manufacturing apparatus 10 is provided with the detector 90 between the change roller 34 and the transport unit 36.

As illustrated in FIG. 15, the manufacturing material 16 used in the manufacturing apparatus 10 has a rectangular shape in cross section, that is, a non-circular shape in cross section. The detector 90 includes a rectangular cylindrical guide 92 through which the manufacturing material 16 passes and a measurement sensor 94 that measures a force in a rotation direction generated in the guide 92.

The measurement sensor 94 detects the twisted state by measuring a force in the twist direction generated in the manufacturing material 16 from the force in the rotation direction generated in the guide 92. The detector 90 acquires the information relating to the accumulation amount based on a measurement value measured by the measurement sensor 94.

(Operations and Effects)

In the present exemplary embodiment having the above configuration, similar operations and effects as those of the fourth exemplary embodiment can be achieved.

Sixth Exemplary Embodiment

Figure 16:
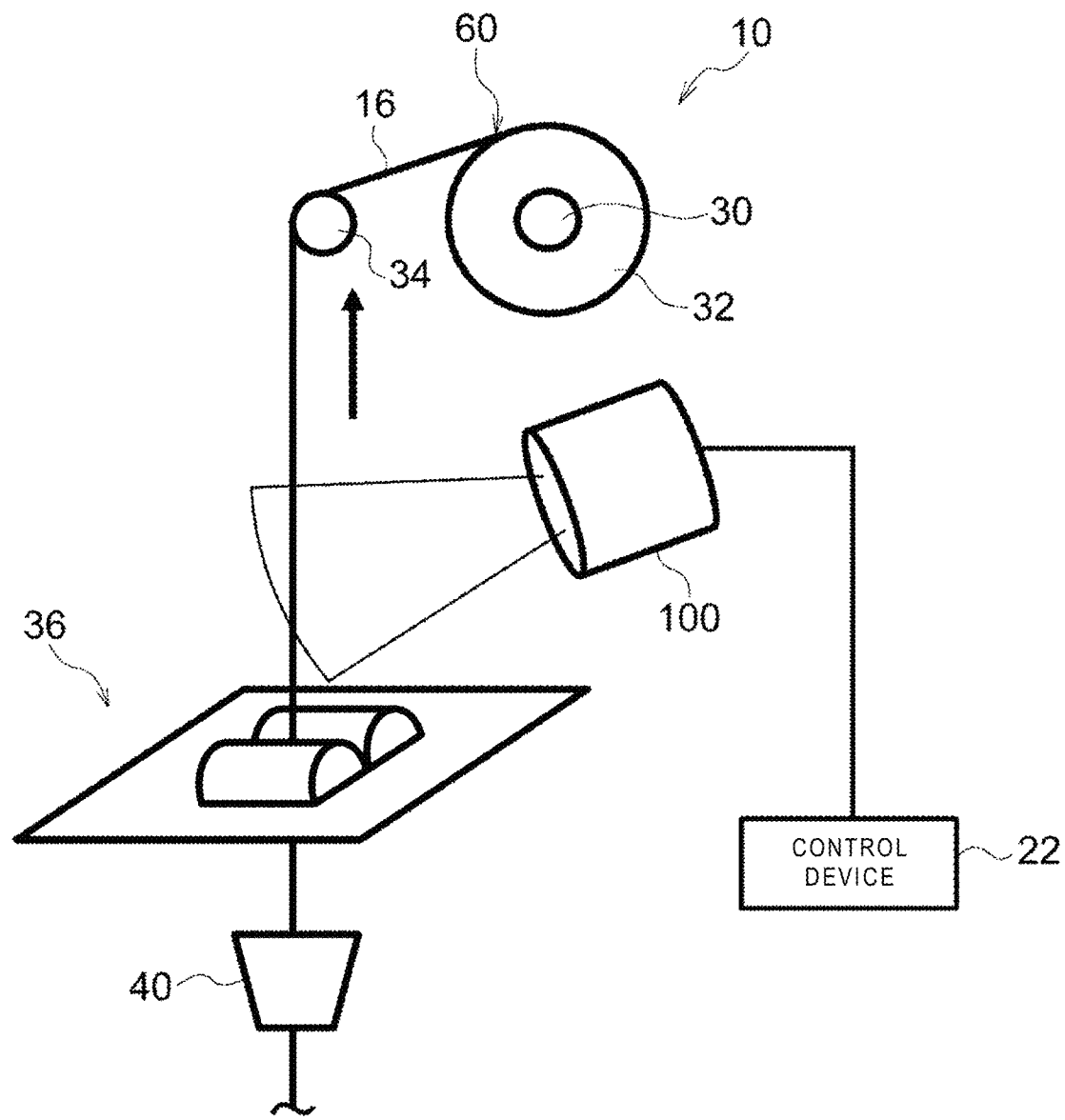
FIG. 16 is a schematic diagram illustrating a part of a manufacturing apparatus according to a sixth exemplary embodiment.

FIG. 16 is a diagram illustrating a sixth exemplary embodiment. The same or equivalent elements as those of the fourth and fifth exemplary embodiments will be designated by the same reference numerals, the description thereof will be omitted, and the following description will focus on differences. The manufacturing apparatus 10 according to the present exemplary embodiment is different from the fourth and fifth exemplary embodiments in a detector 100 that detects the twisted state of the manufacturing material 16.

The detector 100 used in the manufacturing apparatus 10 includes, for example, an optical camera that captures the manufacturing material 16. The detector 100 detects the twisted state of the manufacturing material 16 based on the appearance of the manufacturing material 16.

The detector 100 sends an acquired image to the control device 22. The control device 22 detects surface unevenness of the manufacturing material 16 to detect a twist amount per unit length.

(Operations and Effects)

In the present exemplary embodiment having the above configuration, similar operations and effects as those of the fourth and fifth exemplary embodiments can be achieved.

The manufacturing apparatus 10 detects the twisted state based on the appearance of the manufacturing material 16.

Therefore, an adverse influence of the detector 100 on the manufacturing material 16 is prevented as compared with a case where the twisting force generated in the manufacturing material 16 is measured to detect the twisted state.

Seventh Exemplary Embodiment

Figure 17:
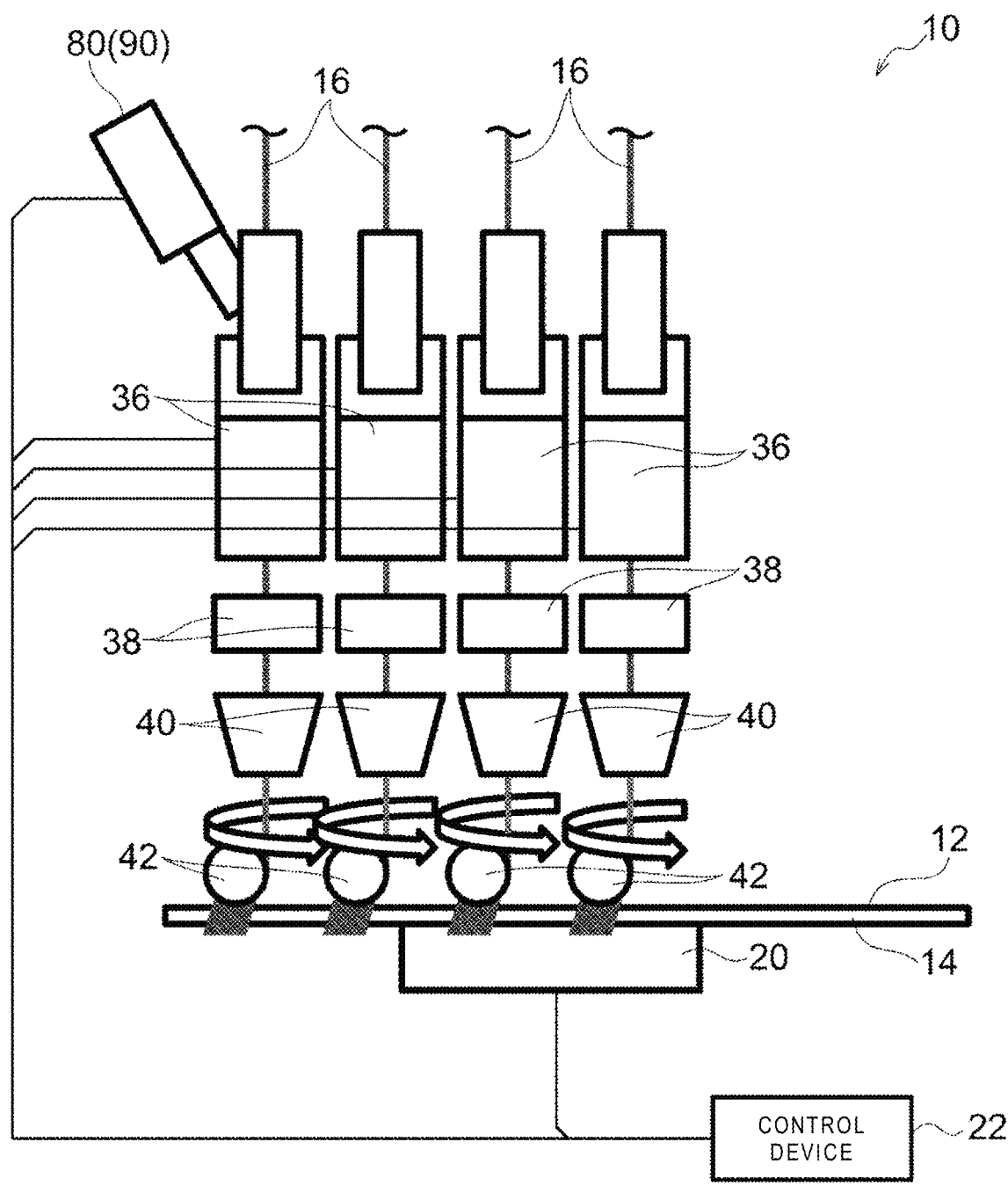
FIG. 17 is a schematic diagram illustrating a part of a manufacturing apparatus according to a seventh exemplary embodiment.

FIG. 17 is a diagram illustrating a seventh exemplary embodiment. The same or equivalent elements as those of the first exemplary embodiment will be designated by the same reference numerals, the description thereof will be omitted, and the following description will focus on differences.

The manufacturing apparatus 10 according to the present exemplary embodiment performs manufacturing using four manufacturing materials 16.

The manufacturing apparatus 10 includes four support shafts 30 and four reels 32 (not illustrated) supported on the respective support shafts 30. The manufacturing apparatus 10 includes transport units 36 and cutting machines 38. The transport units 36 transport the manufacturing materials 16 from the reels 32, respectively. The cutting machines 38 cut the manufacturing materials 16 from the transport units 36, respectively. The manufacturing apparatus 10 further includes manufacturing nozzles 40 and pressure rollers 42. The manufacturing nozzles 40 melt the manufacturing materials 16 from the cutting machines 38, respectively. The pressure rollers 42 press the manufacturing materials 16 delivered from the manufacturing nozzles 40, respectively.

The above-mentioned detector 80 (90) that detects the twisted state of the manufacturing material 16 is provided in only one of the four transport units 36.

(Operations and Effects)

In the present exemplary embodiment having the above configuration, similar operations and effects as those of the first exemplary embodiment can be achieved.

Since the manufacturing apparatus 10 of the present exemplary embodiment performs manufacturing using the plural manufacturing materials 16, it is possible to improve the manufacturing speed.

In the manufacturing apparatus 10, the detector 80 (90) is provided on the only one of the transport units 36. Therefore, the cost can be reduced as compared with a case where the detectors 80 (90) are provided in all the transport units 36. It is possible to cut all the manufacturing materials 16 based on a detection result of the one detector 80 (90).

The information relating to the accumulation amount of the twisting force is acquired from the application paths 56 for all the manufacturing materials 16. Accordingly, the manufacturing material 16 can be cut before any of the accumulation amounts exceeds the threshold value (allowable value).

At this time, if the manufacturing material 16 whose accumulation amount is close to the threshold value (allowable value) is also cut at the same time, a cut cycle until a next cut time can be lengthened.

Herein, an error between the accumulation amount of the twisting force detected by the detector 80 (90) and the accumulation amount of the twisting force acquired based on the application path 56 of the detected manufacturing material 16 is calculated, so that it is possible to correct the accumulation amount of the manufacturing material 16 whose accumulation amount is acquired only from the application path 56.

Accordingly, it is possible to accurately acquire the accumulation amount of the twisting force generated even in the manufacturing material 16 whose accumulation amount is not acquired by the detector 80 (90), and to perform cut control on the manufacturing material 16.

The exemplary embodiment in which the detector 80 (90) is provided only in the one transport unit 36 has been described. Alternatively, the detector 80 (90) may be provided in the two supply devices 18 disposed on both sides. When a direction is changed, the supply devices 18 on an outer side and an inner side are different from each other in the accumulation amount of the twisting force, and the accumulation amounts can be accurately acquired during the manufacturing using the plural supply devices 18.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A manufacturing apparatus comprising:
   a processor programmed to:
      acquire and store a value relating to an accumulation amount of a twisting force generated in a linear manufacturing material during applying, and
      determine whether the value relating to the accumulation amount exceeds a preset threshold value; and
   a cutting machine configured to eliminate the twisting force based on the value relating to the accumulation amount by cutting the manufacturing material,
   wherein the processor is further programmed to control the cutting machine to eliminate the twisting force before the value relating to the accumulation amount exceeds a preset threshold value.

2. The manufacturing apparatus according to claim 1, wherein the processor is programmed to acquire the value relating to the accumulation amount from an application path along which the manufacturing material is applied.

3. The manufacturing apparatus according to claim 2, wherein the value relating to the accumulation amount is right and left direction change amounts on the application path.

4. The manufacturing apparatus according to claim 3, wherein the direction change amounts are the numbers of changes in right and left directions.

5. The manufacturing apparatus according to claim 2, wherein the cutting machine eliminates the twisting force based on the value relating to the accumulation amount and information on the manufacturing material.

6. The manufacturing apparatus according to claim 3, wherein the cutting machine eliminates the twisting force based on the value relating to the accumulation amount and information on the manufacturing material.

7. The manufacturing apparatus according to claim 4, wherein the cutting machine eliminates the twisting force based on the value relating to the accumulation amount and information on the manufacturing material.

8. The manufacturing apparatus according to claim 1, further comprising:
   a detector configured to detect a twisted state of the manufacturing material, and
   the processor is programmed to acquire the value relating to the accumulation amount based on the twisted state detected by the detector.

9. The manufacturing apparatus according to claim 8, wherein the detector detects the twisted state by measuring a force in a twist direction generated in the manufacturing material.

10. The manufacturing apparatus according to claim 8, wherein the detector detects the twisted state based on an appearance of the manufacturing material.

11. A manufacturing apparatus comprising:
    a processor programmed to:
       acquire and store a value relating to an accumulation amount of a twisting force generated in a linear manufacturing material during applying, and
       determine whether the value relating to the accumulation amount exceeds a preset threshold value; and
    an elimination unit configured to eliminate the twisting force based on the value relating to the accumulation amount,
    wherein the processor is further programmed to control the elimination unit to eliminate the twisting force before the value relating to the accumulation amount exceeds a preset threshold value,
    wherein the elimination unit eliminates the twisting force by changing an application path along which the manufacturing material is applied based on the value relating to the accumulation amount so as to reduce the twisting force.

12. The manufacturing apparatus according to claim 1, wherein the value relating to the accumulation amount is a number of degrees.

13. The manufacturing apparatus according to claim 1, wherein the value relating to the accumulation amount is a number of rotations of the manufacturing material.

14. The manufacturing apparatus according to claim 1, further comprising a sensor configured to measure a twisting force of the manufacturing material in the twisting direction.

* * * * *